(12) United States Patent
Olsen et al.

(10) Patent No.: US 9,064,608 B2
(45) Date of Patent: Jun. 23, 2015

(54) NOZZLE INSPECTION TOOL FOR NUCLEAR POWER PLANTS

(75) Inventors: Skyler Olsen, San Antonio, TX (US); Benjamin J. Lgosz-Sinclair, San Antonio, TX (US)

(73) Assignee: IHI Southwest Technologies, San Antonio, TX (US)

( * ) Notice: Subject to any disclaimer, the term of this patent is extended or adjusted under 35 U.S.C. 154(b) by 650 days.

(21) Appl. No.: 13/420,778

(22) Filed: Mar. 15, 2012

(65) Prior Publication Data

US 2013/0243145 A1 Sep. 19, 2013

(51) Int. Cl.
*G21C 17/00* (2006.01)
*G21C 17/01* (2006.01)
*G21C 17/013* (2006.01)
*G21C 17/017* (2006.01)

(52) U.S. Cl.
CPC ............. *G21C 17/01* (2013.01); *G21C 17/013* (2013.01); *G21C 17/017* (2013.01)

(58) Field of Classification Search
CPC ..... G01N 29/265; G01N 29/04; G01N 29/00; G01N 2291/2636; G21C 17/01; G21C 17/003; F16L 55/28; F16L 55/34
USPC .................. 376/249, 245; 73/104, 582, 40.5; 104/138.1–138.2
See application file for complete search history.

(56) References Cited

U.S. PATENT DOCUMENTS

| | | | | |
|---|---|---|---|---|
| 4,502,407 A | * | 3/1985 | Stevens | 114/222 |
| 4,506,549 A | * | 3/1985 | Thome | 73/582 |
| 4,569,230 A | * | 2/1986 | Asty et al. | 73/623 |
| 4,821,665 A | * | 4/1989 | Matthias et al. | 114/222 |
| 5,018,451 A | * | 5/1991 | Hapstack | 104/138.2 |
| 5,285,689 A | * | 2/1994 | Hapstack et al. | 73/623 |
| 5,370,006 A | * | 12/1994 | Zollinger et al. | 73/865.8 |
| 7,512,207 B2 | * | 3/2009 | Smith et al. | 376/249 |
| 7,698,937 B2 | * | 4/2010 | Neidhardt | 73/152.57 |

* cited by examiner

*Primary Examiner* — Jack W Keith
*Assistant Examiner* — Julia Prendergast
(74) *Attorney, Agent, or Firm* — Gunn, Lee & Cave, P.C.

(57) ABSTRACT

A device is provided to inspect welds in nozzles located in water within a containment vessel of a nuclear power plant. A computer connected to the device controls movement by use of thrusters located along a main rail while buoyancy packs regulate the depth. After the device is navigated to a weld needing inspection, feet extend radially outward from the main rail to secure the device in the nozzle. Then transducer clusters are moved along the main rail to be radially inside the weld to be inspected. Thereafter, the transducer clusters are extended radially outward and rotated adjacent to the weld while simultaneously emitting test signals and receiving reflected signals to indicate the condition of the weld.

2 Claims, 9 Drawing Sheets

NOZZLE INSPECTION TOOL FOR NUCLEAR POWER PLANTS

BACKGROUND OF THE INVENTION

1. Field of the Invention

This invention relates to a nozzle inspection tool, and more particularly, a nozzle inspection tool that can be used to inspect nozzles within a nuclear reactor.

2. Description of the Prior Art

The use of nuclear energy to generate electricity began in the early 20$^{th}$ century after the discovery that radioactive elements such as radium release immense amounts of energy. Initially, however, harnessing such energy was impractical because intensely radioactive elements are very short-lived.

By the late 1930s, experiments were being conducted with nuclear fusion. Those experiments in nuclear fusion led to the Manhattan Project, which led to the first nuclear weapons, which were used in World War II on the cities of Hiroshima and Nagasaki.

After World War II, nuclear energy was used to generate power with the USSR's Obninsk Nuclear Power Plant becoming the world's first nuclear power plant to generate electricity for a power grid. The world's first commercial nuclear power plant was opened in 1956 in Sallafield, England. The first commercial nuclear generator to become operational in the United States was the Shipping Port Reactor in Pennsylvania in 1957.

By 2005, 15% of the world's electricity was generated by nuclear power, with the United States, France and Japan accounting for 56% of the nuclear generated electricity. As of December 2009, the world had 436 nuclear reactors.

While many different things have affected the number of nuclear reactors, the growth of nuclear power was impeded by (1) the Three-Mile Island accident in 1979, (2) Zhernobyl disaster in 1986, and (3) Wukushima Daiichi nuclear disaster in 2011. With these accidents, there has been an increased emphasis on safety and a decline in the growth rate of nuclear reactors. One of the areas of increased safety emphasis is in the containment vessel and in the lines flowing fluid to and from the nuclear power plant reactors. An item requiring inspection is the various welds and joints in (1) the containment vessel, (2) nuclear power reactors and (3) the lines leading and from such vessels.

In the United States, there are approximately 104 operating nuclear reactors. Of those, sixty-nine are pressurized water reactors (PWR) and thirty-five are boiling water reactors (BWR). In both the PWR and BWR, fluid is converted to steam and the steam is used to turn a turbine that generates the electricity. The conduits taking the fluid or steam to or from the turbine have to be inspected, especially the welds occurring in the nozzles.

In the United States, the Nuclear Regulatory Commission (NRC) is responsible for ensuring public health through licensing and inspection of nuclear power plants. One of the things that the NRC requires to be inspected are the welds that occur in the containment vessel and in the nozzles leading to and from the containment vessel.

SUMMARY OF THE INVENTION

It is an object of the present invention to provide a tool for inspecting welds in the nozzle of a nuclear reactor.

It is yet another object of the present invention to provide a submersible device that can enter the fluid contained in a nuclear reactor and go inside of the nozzles to inspect the welds contained therein.

It is yet another object of the present invention to provide a tool that is self-contained and can directed itself inside of the nozzle of the nuclear reactor and position itself therein so that the welds in the nozzle can be inspected.

It is still another object of the present invention to provide a tool that is buoyancy compensated with its own thrusters for properly locating itself inside the nozzles of the nuclear reactor for inspection of welds therein.

It is even another object of the present invention to provide feet on a tool that will extend radially outward to center the tool in a nozzle of a nuclear reactor to allow for inspection of the weld there around.

A main rail is provided with a buoyancy pack on either end thereof with thrusters for repositioning the entire device. On either end of the main rail between the buoyancy packs are located expandable feet that extend outwardly at approximately every 120° to contact around the nozzle and position the tool therein. While the expandable feet hold the tool in the nozzle, an expandable and rotating transducer package extends outward to a weld joint and radially rotates so a transducer package can inspect the entire weld. If there is more than one weld in the nozzle, (1) expanding and rotating transducer package is retracted, (2) expandable feet are refracted and (3) the device is moved to a position adjacent to another weld. The process is then repeated with the expandable feet expanding outward to secure the device. Thereafter, expandable and rotating transducer packages are expanded outward and rotated adjacent to the weld so that the entire weld is inspected. At the ends of each of the expandable feet are snubbers for securing the tool in position.

DESCRIPTION OF THE DRAWINGS

FIG. 6A is a side view of the inspection tool in front of a nozzle opening of a nuclear power plant.

DESCRIPTION OF THE PREFERRED EMBODIMENT

Figure 1:
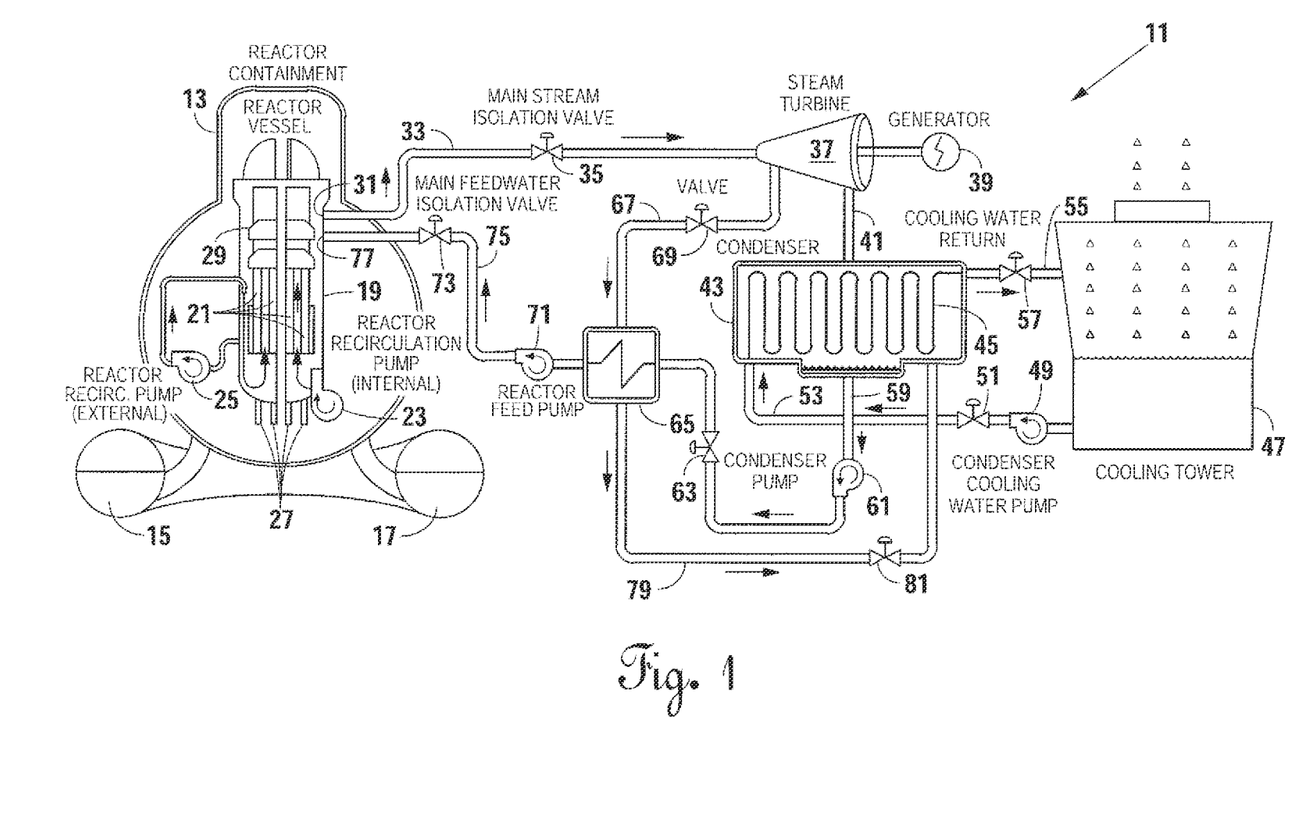
FIG. 1 is an illustrative flow diagram of a nuclear power plant.

An illustrative flow diagram for a nuclear power plant for generating electricity is shown in FIG. 1 and is represented generally by reference numeral 11. The nuclear power plant 11 has a reactor containment vessel 13 that has a Taurus 15 with an auxiliary water feed 17, which is a backup water supply for the nuclear power plant 11.

Inside of the reactor containment vessel 13 is located a reactor pressure vessel 19. A bundle of fuel rods 21 absorb a neutron to cause nuclear fission on release of other neutrons. The nuclear fission heats the water contained within reactor pressure vessel 19 to convert it to steam.

To ensure the bundle of fuel rods 21 remain immersed in water an internal reactor recirculation pump 23 continues to recirculate water over the bundle of fuel rods 21. Also, an external reactor recirculation pump 25 circulates water within the reactor pressure vessel 19 to ensure the bundle of fuel rods 21 remain cool and immersed in the water.

While in the reactor pressure vessel 19 different fluids have been used, including gas, liquid metal or molten salts to ensure that the nuclear reaction does not run away. Control rods 27 are located in the bottom of the reactor pressure vessel 19. The control rods 27 absorb some of the released neutrons to prevent too large of a nuclear reaction with the bundle of fuel rods 21.

Above the bundle of fuel rods 21 is located heat exchanger 29, which is used to convert the water to steam. Steam generated in the reactor pressure vessel 19 enters steam line 33 through outlet nozzle 31. The steam flows through the steam line 33 and the main steam isolation valve 35 to enter steam turbine 37. As the steam turns the steam turbine 37, steam turbine 37 turns generator 39, which generates electricity.

After the steam flows through the steam turbine 37, a major portion of the steam flows through the main steam exit conduit 41 to condenser 43. Circulating through the condenser coil 45 is cooling water received from the cooling tower 47 via condenser cooling water pump 49, cooling water control valve 51 and cooling water inlet conduit 53. The cooling water returns to the cooling tower 47 via cooling water return conduit 55 and cooling water return valve 57. The cooling water can be of any convenient source such as lake water or river water. The cooling water does not have to be refined or processed.

From condenser 43 through the feed water return conduit 59, the water is being pumped by condenser pump 61 through water return valve 63 into a feed water heater/preheater 65. The feed water flowing back to the reactor pressure vessel 19 is heated/preheated inside of feed water heater/preheater 65 which receives some of the steam flowing through steam turbine 37 through preheater steam conduit 67 and control valve 69 to feed water heater/preheater 65. The feed water heater/preheater 65 increases the temperature of the feed water significantly prior to returning to the reactor pressure vessel 19 via reactor feed pump 71, main feed water isolation valve 73 and main feed water return conduit 75. The main feed water is discharged into the reactor pressure vessel 19 through return nozzle 77.

Any remaining portion of the preheater steam received in the feed water heater/preheater 65 flows to condenser 43 through preheater steam conduit 79 and preheater steam control valve 81.

The outlet nozzle 31 and return nozzle 77 are very large in size and may vary anywhere from 24 inches to 46 inches in diameter. Also, there is more than one of the outlet nozzle 31 and the return nozzle 77. There are usually between two to six outlet nozzles 31 and return nozzles 77. These outlet nozzles 31 and return nozzles 77 handle extreme loads and extreme heat cycles. Pressure can be in the thousands of pounds per square inch (psi). Typically, the outlet nozzles 31 and return nozzles 77 are made by welding pipe together, which welds may be of the same type of metal or may be dissimilar metals. For example, the main feed water return conduit 75 may be of one type of metal, but the reactor pressure vessel 19 may be of a different type of metal. Different metals are used for a variety of different reasons, including strength, resistance to corrosion, or more economical.

Because of the extremes of temperature and pressure through which the outlet nozzle 31 or the return nozzle 77 must endure, it is important to periodically check the welds to make sure the welds are holding.

Figure 2:
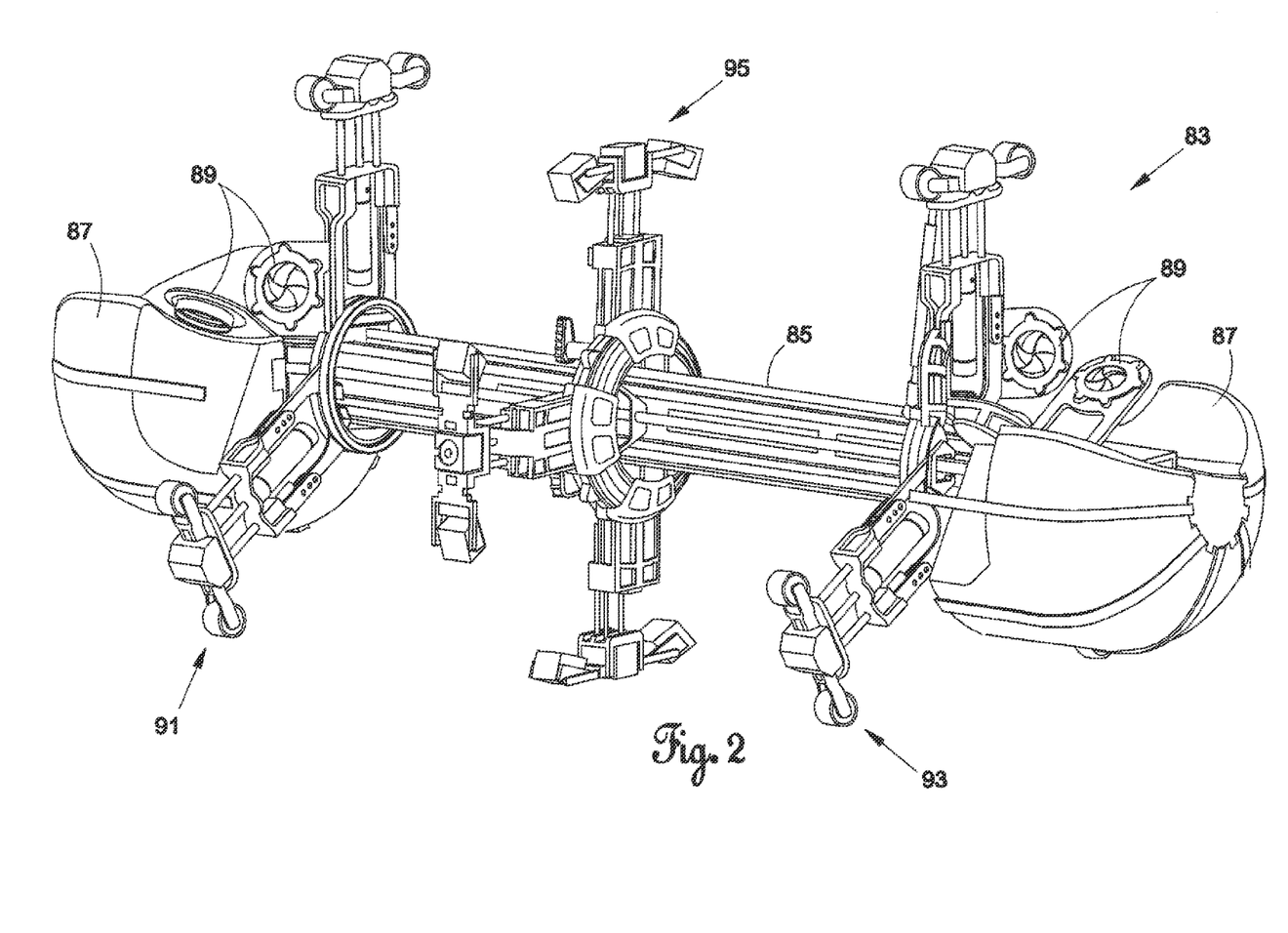
FIG. 2 is a perspective view of a tool for inspecting welds in nozzles of nuclear power plants.

The present invention relates to a nozzle inspection tool 83 as shown pictorially in FIG. 2. The nozzle inspection tool 83 has a main rail 85 on which everything is mounted. The main rail 85 looks very similar to an I-beam.

On each end of the main rail 85 are buoyancy packs 87. The buoyancy packs 87 are partially cut away so that thruster clusters 89 can be seen. The thruster clusters 89 are used to control the direction of movement of the nozzle inspection tool 83. The buoyancy packs 87 adjust the buoyancy of the nozzle inspection tool 83 so that the tool can be maintained at a particular depth.

Mounted on either end of the main rail 85 are expandable foot clusters 91 and 93, which are identical. However, both expandable foot clusters 91 and 93 are independently moveable along the main rail 85. Between the expandable foot clusters 91 and 93 is located expanding/rotating transducer package 95.

Figure 3:
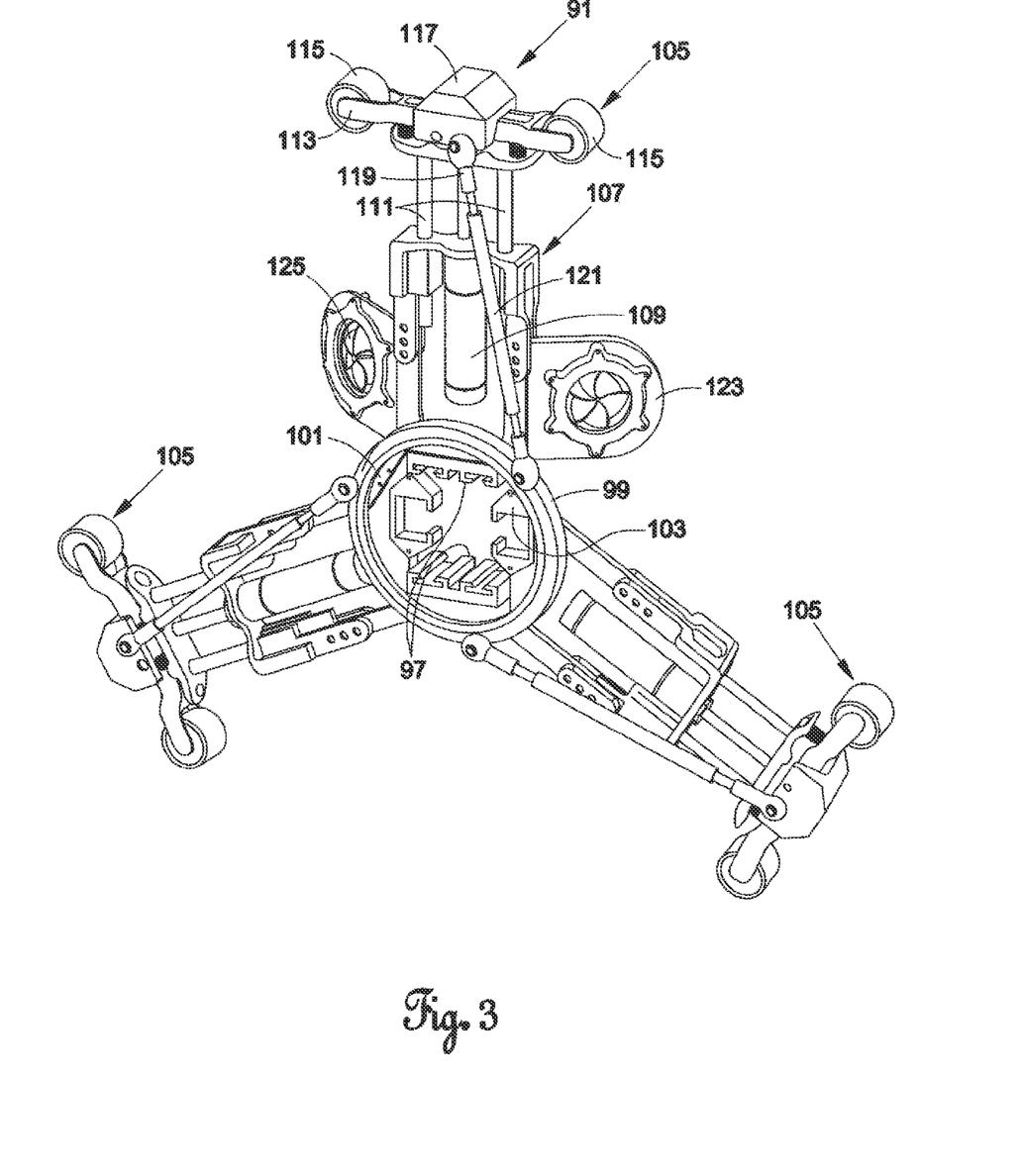
FIG. 3 is a perspective view of an expandable foot portion of the inspection tool shown in FIG. 2.

Referring to the perspective view of expandable foot cluster 91 in FIG. 3, operation of the expandable feet cluster 91 will be explained in more detail. Expandable foot cluster 91 is identical to expandable foot cluster 93. In the center of the expandable foot cluster 91 are linear bearings 97 that press against the main rail 85 (see FIG. 2). Linear bearings 97 are carried inside of expansion control ring 99. The linear bearings 97 are connected to a central frame 101 through which the main rail 85 may slide. Connected to the central frame 101 are cable bundle guides 103. The expansion control ring 99 is pivotally attached to central frame 101.

Extending outwardly in a radial direction from the central frame 101 are expandable feet 105. There are three identical expandable feet 105 located at approximately 120° around the central frame 101 and extending radially outward from the central frame 101. Each of the expandable feet 105 have an adjustment bracket 107 connected to the central frame 101. Contained inside of the adjustment bracket 107 are air cylinders 109.

Extending outwardly from the adjustment bracket 107 are adjustment rods 111. The adjustment rods 111 are telescopically received into adjustment bracket 107 with the outer end of the adjustment rods 111 being connected to a foot bracket 113. The foot bracket 113 is approximately perpendicular to the adjustment rods 111. On each end of the foot bracket 113 are located rollers 115. Between the rollers 115 and also mounted on the foot bracket 113 is a rubber snubber 117. The rubber snubber 117 extends radially outward slightly more than the rollers 115 on the expandable feet 105. A push rod 119 connects between the air cylinder 109 and the foot bracket 113 so that as the expandable foot 105 expands, push rod 119 would extend radially outward. As the expandable foot 105 retracts, push rod 119 would move radially inward.

Since each of the expandable feet 105 may extend outward different amounts, expansion control ring 99 is rotatably carried on the central frame 101. As the expansion control ring 99 rotates, connecting rods 121 which connect from the expansion control ring 99 to the foot bracket 113 of each of the expandable feet 105, causes each expandable foot to also move. The expansion ring 99 with the connecting rod 121 ensures that the expandable foot cluster 91 is centered inside of a conduit in a manner as will be subsequently described.

Also, a couple of the thrusters 123 and 125 of the thruster cluster 89 are shown attached to adjustment bracket 107. However, the thrusters 123 or 125 may be connected at other locations along the nozzle inspection tool 83.

Referring back to FIG. 2, expandable foot clusters 91 and 93 are shown on each end of the main rail 85. The expanding/ rotating transducer package 95 shown in FIG. 2, will be explained in more detail in the elevated view shown in FIG. 4 and the cross-sectional view of FIG. 5 taken along section lines 5-5 of FIG. 4. A transducer central frame 127 receives the main rail 85 there through. Linear bearings 129 allow the expandable/rotating transducer package 95 to move smoothly along main rail 85. Threadably connected to the transducer central frame 127 are lead screws 131. Lead screws 131 will adjust the expanding/rotating transducer package 95 linearly along the main rail 85 of the nozzle inspection tool 83.

Figure 4:
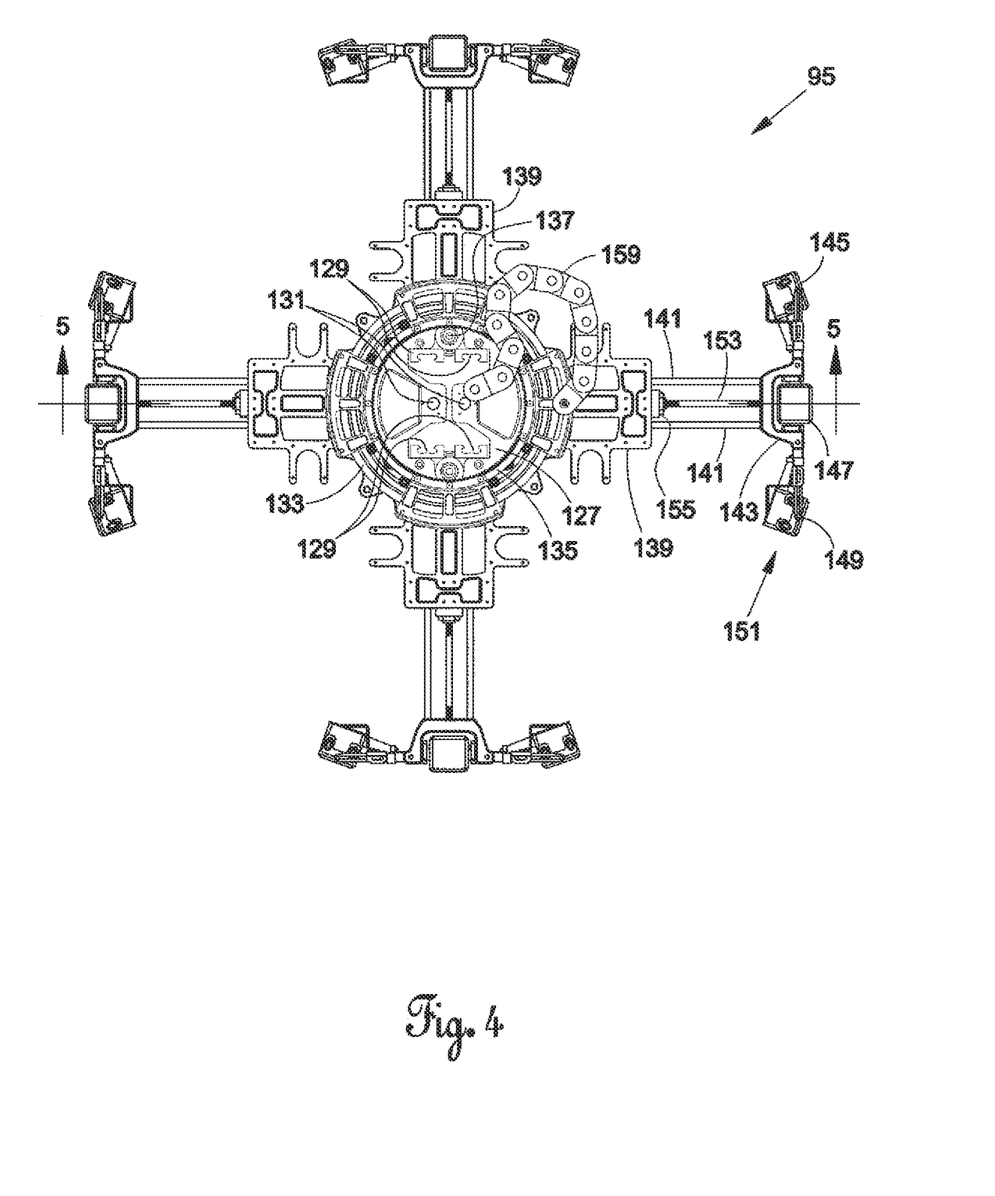
FIG. 4 is an elevated view of the expanding/rotating transducer package of the inspection tool shown in FIG. 2.
Figure 5:
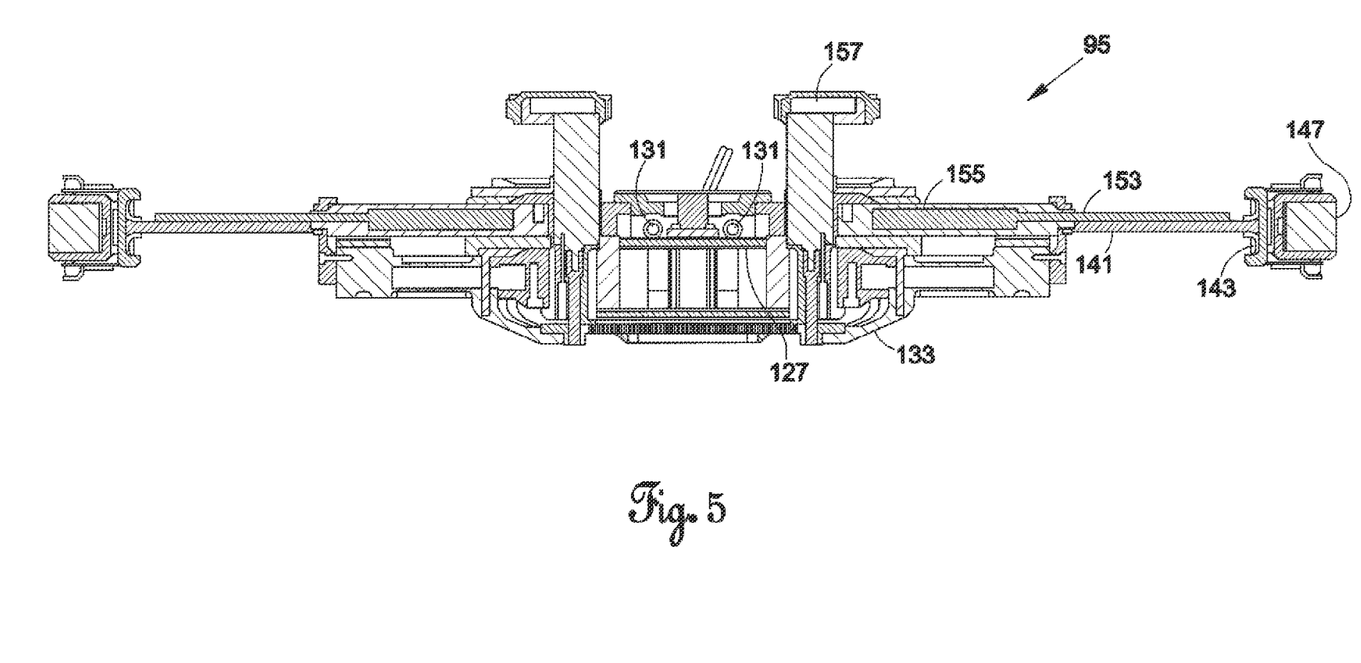
FIG. 5 is a cross-sectional view of FIG. 4 along section lines 5-5.

Rotatably connected to the transducer central frame 127 is external ring 133. A ring gear 135 is connected to external ring 133 so that when ring gear 135 is driven by drive gear 137, the external ring 133 and everything connected thereto will rotate about main rail 85 (see FIG. 2).

Connected to the ring gear 133 at approximately 90° apart are linear guide mounts 139. Extending radially outward from the linear guide mounts 139 are linear guides 141. The linear guides 141 extend radially outward from linear guide mounts 139 with the outermost end of the linear guide mounts 141 connected to a transducer mounting bracket 143. The transducer mounting bracket 143 has mounted thereon a left transducer 145, center transducer 147 and a right transducer 149 to make up a transducer cluster referred to generally by reference numeral 151. Connecting to the center of the transducer mounting bracket 143 is a connecting rod 153 that connects between transducer mounting bracket 143 and air cylinder 155 secured inside of linear guide mounts 139.

If the expanding/rotating transducer package 95 needs to be rotated, motor cam assembly 157 (shown in FIG. 5) will cause the rotation. Cable guide 159 (shown in FIG. 4) will protect the cabling that connects to transducers 145, 147 and 149 to prevent damage. While the electrical connections are not described in detail herein, electrical connections must connect to each of the transducers 145, 147, and 149 for signals to be transmitted to and from these transducers. Also, various control signals are used to control operation of nozzle inspection tool 83.

Figure 6B:
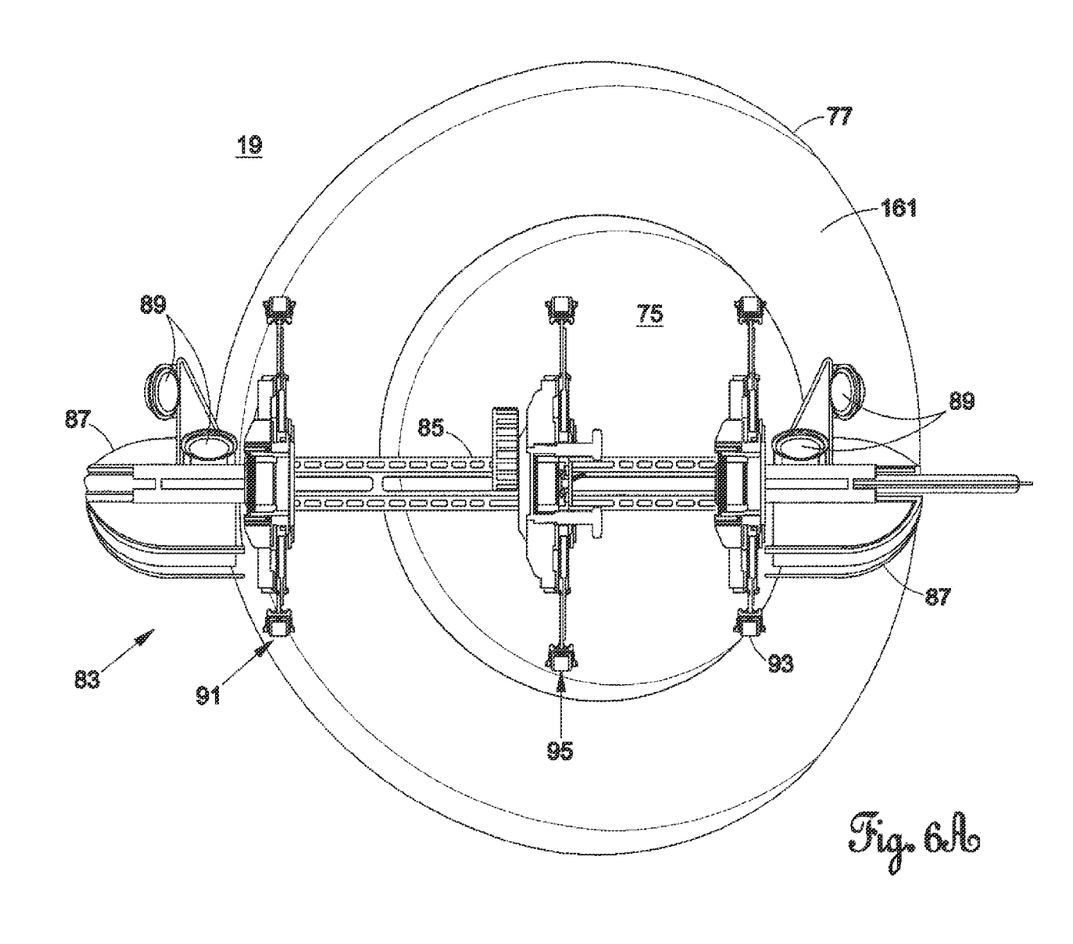
FIG. 6B is a cross-sectional view of a nozzle in a nuclear power plant with the inspection tool moving therein.
Figure 6C:
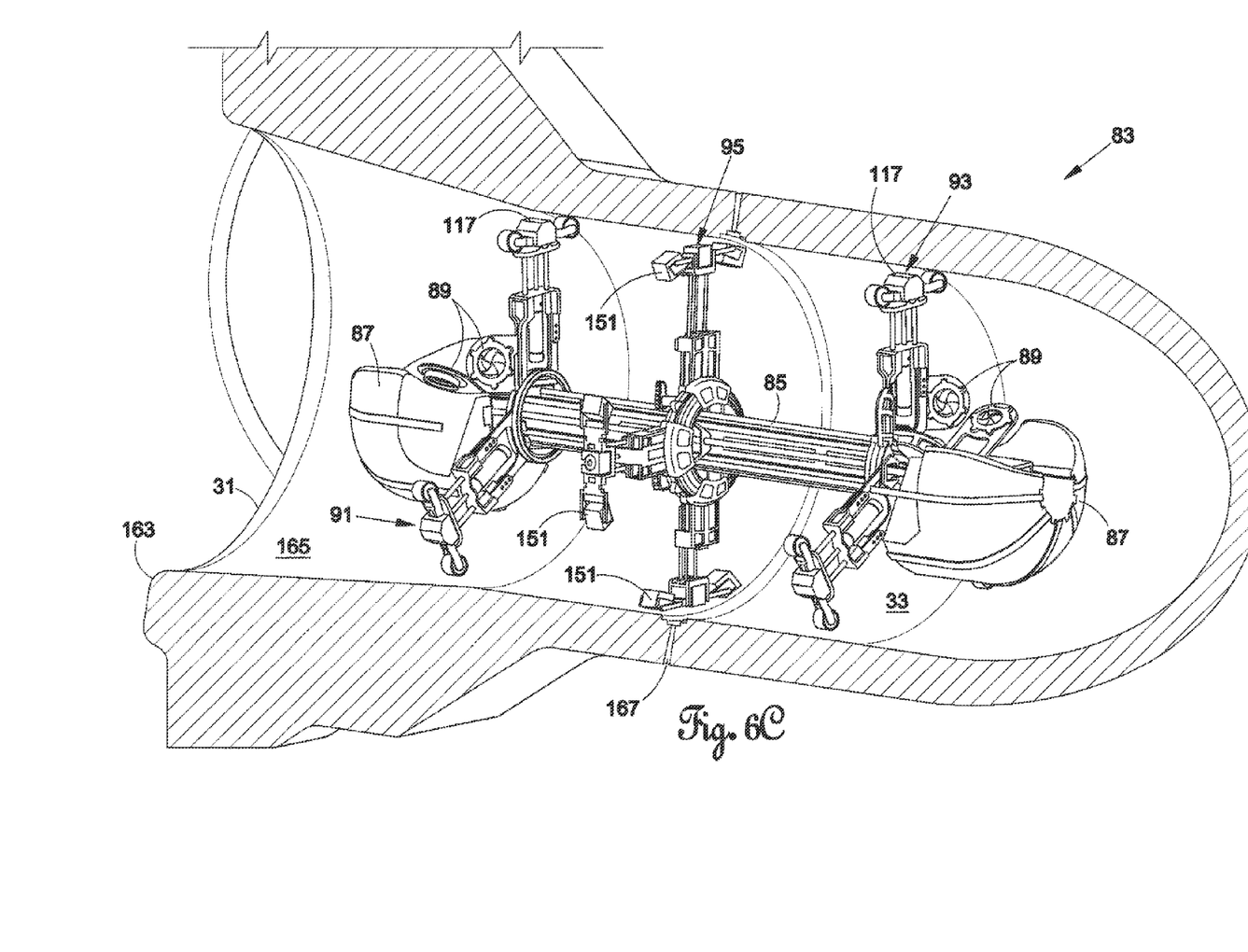
FIG. 6C is a sectional view of a nozzle in a nuclear power plant with the inspection tool being shown in perspective about to inspect a weld.

Referring now to FIGS. 6A, 6B and 6C sequential views show the nozzle inspection tool 83 being used in a nozzle. Referring to FIG. 6A, the nozzle inspection tool 83 is shown in front of return nozzle 77, also sometimes called inlet nozzle. The return nozzle 77 has a tapered section 161 connecting between the return nozzle 77 and the main feed water return conduit 75 of the reactor pressure vessel 19 (see FIG. 1).

The nozzle inspection tool 83 (shown in FIG. 6A) has the expandable foot clusters 91 and 93 as mounted on the main rail 85 in the retracted position. The expanding/rotating transducer packages 95 are also in the retracted position. The buoyancy packs 87 keep the nozzle inspection tool 83 at the desired depth while the thruster clusters 89 provide movement of the nozzle inspection tool 83.

FIG. 6B illustrates movement of the nozzle inspection tool 83 inside of outlet nozzle 31. Outlet nozzle 31 has an inward shoulder 163 and an inward flair 165. The outlet nozzle 31 is connected to steam line 33 by weld 167. Weld 167 may be a weld of similar metals or it may be a weld of dissimilar metals. The object is for the nozzle inspection tool 183 to inspect weld 167.

Referring now to FIG. 6C, the nozzle inspection tool 83 has moved inside of outlet nozzle 31 and the expandable foot clusters 91 and 93 have been expanded so that the rubber snubbers 117 are pressed against either the nozzle 31 or the steam line 33. The snubbers securely hold the inspection tool in position. While being held in position, the expanding/rotating transducer package 95 extends outward into a position immediately adjacent to weld 167. Now the electronic assembly nozzle inspection tool 83 is turned ON and the expanding/rotating transducer package 95 is rotated so that each of the transducer clusters 151 may check the integrity of the weld 167.

Figure 7:
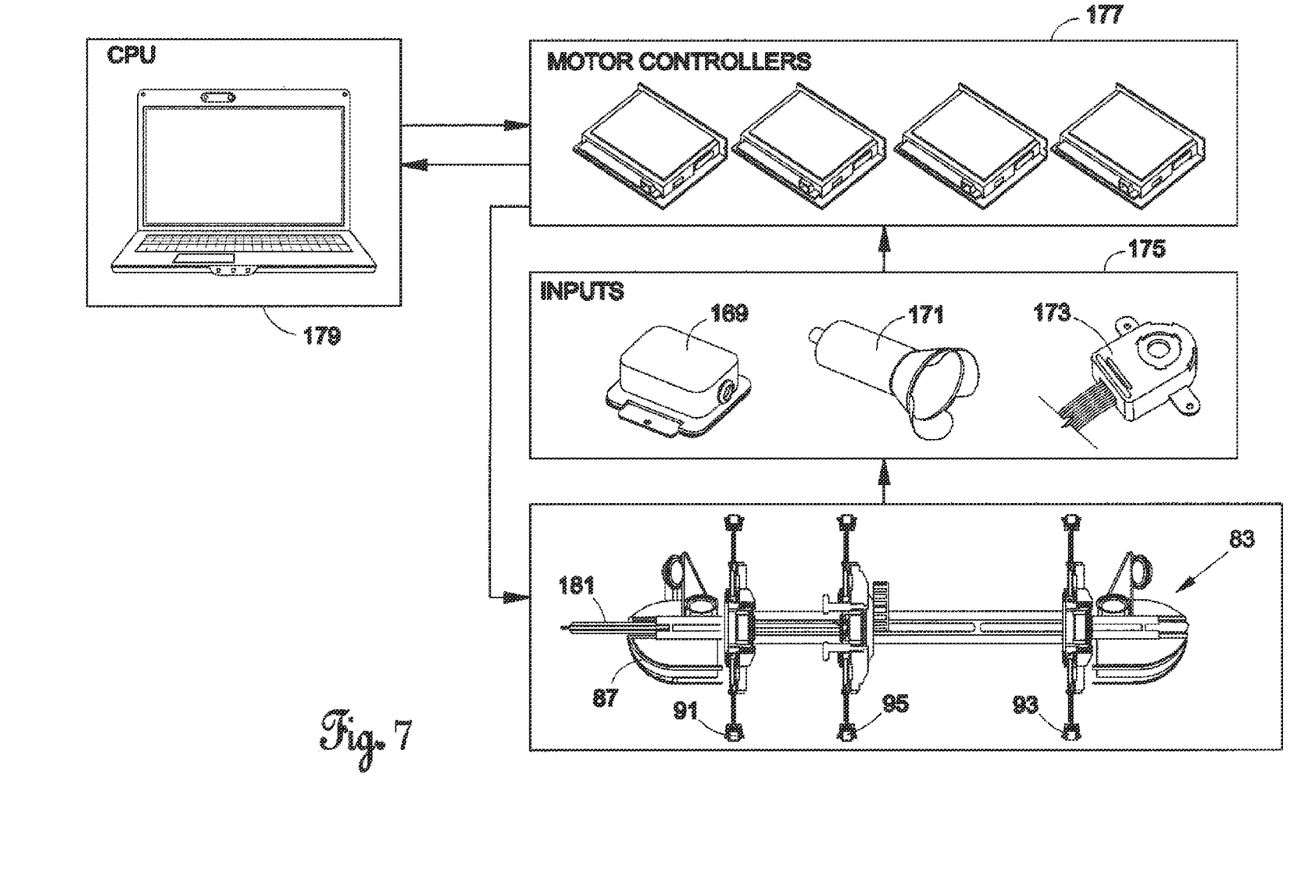
FIG. 7 is a pictorial block diagram of how the tool shown in FIGS. 1-6 is controlled.

Referring to FIG. 7, a general explanation as to the control system for nozzle inspection tool 83 is provided. Located on the nozzle inspection tool 83 near the buoyancy pack 87 is an inertia measurement unit 169. The inertia measurement unit 169 is used by applicant and sold under the brand name XSENS, Model MT. The inertia measurement unit 169 is a miniature gyro-enhanced altitude and heading reference system with a low-power signal processor that provides drift-free 3-D orientation, 3-D acceleration, 3-D rate of turn and 3-D earth-magnet field data. The inertia measurement unit 169 gives real time computed altitude/heading and inertia dynamic data. Also, the inertia measurement unit 169 either accepts or generates synchronization pulses.

Also contained on board the nozzle inspection tool 83 is a camera 171 mounted near or on the buoyancy pack 87. While many different types of cameras can be used, a Mantis hi-definition camera is a typical example of a camera that can be used. By use of the camera 171, an operator of the nozzle inspection tool 83 can see the direction nozzle inspection tool 83 is moving. While the present nozzle inspection tool 83 only has one camera 171, multiple cameras could be used.

The Mantis camera is an internally integrated digital camera that allows for image capture and documentation. The images being received by the Mantis camera can by simultaneously viewed optically and digitally.

Also located on the nozzle inspection tool 83 are encoders 173 located on the backside of each of the motors (not shown) on nozzle inspection tool 83, excluding the motors contained in each of the thruster clusters 89. The encoders 173 that have been found suitable for the present invention are sold under the name Avago. The model that is found to be particularly suitable is the HELV-5540. These particular encoders are found to be very good for use in noisy environments. The Avago encoder provides precise positioning and velocity sensing information to servo motor feedback systems used in the operation nozzle inspection tool 83.

Each of the inputs referred to generally as 175 connect to motor controllers 177. While different types of motor controllers can be used, a Maxon motor controller, Model EPOS 2 is found to be particularly suitable for the present invention. Motor controllers 177 are connected to a central processing unit 179 and receive and send communications thereto.

In operation inputs 175 from the inertia measurement unit 179, camera 171, and encoders 173 located on the nozzle inspection tool 83 or are received through a cable connection 181 from the nozzle inspection tool 83 to the motor controllers 177. The motor controllers 177 provide feedback to the nozzle inspection tool 83 and the central processing unit 179. The operator then, through the central processing unit 179, may control operation of the nozzle inspection tool 83 via communications with the motor controllers 177.

Through proper use of commands through the central processing unit 179, an individual can control operation of the nozzle inspection tool 83. Referring to FIGS. 6A, 6B, and 6C, the nozzle inspection tool 83 can be directed to any position desired in the outlet nozzle 31 or the steam line 33. Also, the nozzle inspection tool 83 may be directed into the return nozzle 77. Once the nozzle inspection tool 83 is in position, the expandable feet clusters 91 and 93 will extend outward to secure the nozzle inspection tool 83 into position. Once the expanding/rotating transducer package 95 is in position next to weld to be inspected, the expanding/rotating transducer package 95 will extend outward so that the transducers thereon are immediately adjacent to the weld to be inspected. Thereafter, the expanding/rotating transducer package 95 is rotated to inspect the weld.

We claim:

1. A device for inspecting welds in nozzles of a containment vessel filled with water in a nuclear power plant comprising:
    a main rail;
    buoyancy packs attached to said main rail;
    a plurality of radially expandable feet attached to said main rail near each end thereof, at least three of said expandable feet radially dispersed around said main rail, each foot of said expandable feet having a snubber for gripping said nozzle to hold said device in position, rollers adjacent said snubbers on said expandable feet aiding in positioning said device in said nozzle;
    a plurality of at least three transducer clusters attached to said main rail and being radially extendable outward therefrom, said transducer clusters having at least three transducers in each transducer cluster, said transducer clusters being radially located at equal angles around said main rail;
    thrusters attached to said main rail for moving said device in said water into one of said nozzles;
    a first cylinder for radially extending said expandable feet to secure said device in one of said nozzles on both sides of one of said welds;
    a first motor controller for moving said transducer clusters along said main rail until said transducer clusters are radially inside said weld;
    a second cylinder radially extending said transducer cluster adjacent to said weld;
    a second motor controller rotating said transducer clusters adjacent said weld so that said transducer clusters send test signals to said weld and receive reflected test signals from said weld to determine condition of said weld, said transducer clusters being rotated around said main rail while sending test signals to said weld and said receiving said reflected test signals from said weld.

2. The device for inspecting welds in nozzles of a containment vessel filled with water in a nuclear power plant as recited in claim 1 wherein said device is connected to a control processing unit located outside said water, said control processing unit communicating with motor controllers connected to said thrusters to cause a movement of said device in said water, inputs being received from said device and transmitted via said motor controllers to said control processing unit.

* * * * *